(12) United States Patent
Goeller et al.

(10) Patent No.: US 7,200,658 B2
(45) Date of Patent: Apr. 3, 2007

(54) NETWORK GEO-LOCATION SYSTEM

(75) Inventors: Kenneth Goeller, Beverly Hills, CA (US); Bryan Gentry Spaulding, Santa Monica, CA (US); John P. Godwin, Los Angeles, CA (US); Bruce Anderson, Westchester, CA (US); Luan Le-Chau, Los Angeles, CA (US)

(73) Assignee: Movielink, LLC, Santa Monica, CA (US)

( * ) Notice: Subject to any disclaimer, the term of this patent is extended or adjusted under 35 U.S.C. 154(b) by 658 days.

(21) Appl. No.: 10/704,519

(22) Filed: Nov. 6, 2003

(65) Prior Publication Data

US 2005/0021738 A1    Jan. 27, 2005

Related U.S. Application Data

(60) Provisional application No. 60/425,527, filed on Nov. 12, 2002.

(51) Int. Cl.
*G06F 15/173* (2006.01)

(52) U.S. Cl. ............... 709/224; 709/238; 709/245; 709/217

(58) Field of Classification Search ............ 709/224, 709/238, 241, 245, 217
See application file for complete search history.

(56) References Cited

U.S. PATENT DOCUMENTS 5,675,741 A    10/1997   Aggarwal et al.
6,154,172 A    11/2000   Piccionelli et al.
6,665,715 B1 * 12/2003   Houri ......................... 709/217
6,973,489 B1 * 12/2005   Levy ........................... 709/224
7,020,719 B1 *  3/2006   Grove et al. ................. 709/238
7,062,572 B1 *  6/2006   Hampton ..................... 709/245
7,139,834 B1 * 11/2006   Albanese et al. ............ 709/238
2002/0143991 A1 * 10/2002  Chow et al. ................. 709/245
2003/0099202 A1 *  5/2003  Lear et al. ................... 370/238
2003/0110293 A1 *  6/2003  Friedman et al. ........... 709/245

* cited by examiner

*Primary Examiner*—Philip B. Tran
(74) *Attorney, Agent, or Firm*—Gottlieb, Rackman & Reisman (57) ABSTRACT

A method for accurately determining the geographic location of a PC or other networked device on the Internet. Client software furnished by a service provider performs trace-route or other network analysis commands to known servers (e.g., eBay, Yahoo, Amazon) or even servers at random locations. The client collects an array of IP address and other network information as a result of the trace-routes, and the trace-route IP information is then transmitted to the service provider that is trying to identify the geographic location of the client. Using the array of IP addresses thus generated, the Internet server software can analyze location information of each Internet hop within each trace-route. For example, the server might look at the first five hops from the client to the server. If four of the five routers have addresses within the geographic area of interest, the server can conclude that the client is probably within the geographic area.

9 Claims, 5 Drawing Sheets

| Hop | IP Address | Node Name | Location | Tzone | Ms | Network |
|---|---|---|---|---|---|---|
| 0 | 192.168.1.131. | kgoeller-1t.digitaldist.net | .... |  | 0 | private use |
| 1 | 192.168.1.1 | - | ... | 8:00 | 3 | private use |
| 2 | 4.24.199.117 | multilink5.lsanca1-cr12.bbnplanet | LA, CA USA | 8:00 | 3 | Genuity |
| 3 | 4.24.10.109 | p5-0.lsanca1-cr8.bbnplanet.net | LA, CA USA | 8:00 | 3 | Genuity |
| 4 | 4.24.5.53 | p6-0.lsanca2-br2.bbnplanet.net | LA, CA USA | 8:00 | 4 | Genuity |
| 5 | 4.24.5.45 | p15-0.lsanca2-br1.bbnplanet.net | LA, CA USA | 8:00 | 3 | Genuity |
| 6 | 4.25.112.1 | p15-0.lsanca2-cr2.bbnplanet.net | LA, CA USA | 8:00 | 3 |  |
| 7 | 208.172.33.204 | acr2-so-2-0-0-0.anaheim.cw.net | Anaheim,CA USA | 8:00 | 4 | Cable&Wireless USA |
| 8 | 208.172.34.103 | agr3-loopback.anaheim.cw.net | Anaheim,CA USA | 8:00 | 5 | Cable&Wireless USA |
| 9 | 208.172.44.9 | dcr1-so-0-2-0.anaheim.cw.net | Anaheim,CA USA | 8:00 | 5 | Cable&Wireless USA |
| 10 | 208.172.44.82 | cable-and-wireless-isp-anaheim.cw.net | Anaheim,CA USA | 8:00 | 6 | Cable&Wireless USA |
| 11 | 216.34.192.4 | bbr02-g2-0.elg01.exodus.net | El Segundo,CA USA | 8:00 | 6 | Exodus Com. USA |
| 12 | 206.79.9.234 | bbr02-p1-0-irvn02.exodus.net | Irvine, CA USA | 8:00 | 8 | Exodus Com. USA |
| 13 | 216.39.96.17 | bbr01-g6-0.irvn02.exodus.net | Irvine, CA USA | 8:00 | 8 | Exodus Com. LA, USA |
| 14 | 209.1.169.10 | dbbr02-p5-0.ftwo01.exodus.net | Ft.Worth, TX USA | 8:00 | 75 | Exodus Com. USA |
| 15 | 216.39.64.17 | bbr01-g6-0.ftwo01.exodus.net | Ft.Worth, TX USA |  | 75 | Exodus Com. Dalllas,USA |
| 16 | 209.1.169.22 | bbr-p1-0.atln01.exodus.net | Atlanta, GA USA | 5:00 | 92 | Exodus Com. |
| 17 | 216.35.162.129 | bbr01-g5-.atln01.exodus.net | Atlanta, GA USA | 5:00 | 92 | Exodus.Com |
| 18 | 216.32.132.178 | bbr01-p1-0stng01.exodus.net | Sterling, VA USA | 5:00 | 92 | Exodus.Com |
| 19 | 216.33.96.145 | dcr01-g8-0.stng01.exodus | Sterling, VA USA | 5:00 | 93 | Exodus.Com |
| 20 | 216.33.98.18 | Csr21-ve241.stng01.exodus | Sterling, VA USA | 5:00 | 96 | Exodus.Com |
| 21 | 216.35.210.122 |  |  |  | 93 | Exodus.Com |
| 22 | 64.58.79.230 | yahoo.com | 37.24n,121.99.59w |  | 93 | Yahoo |

Fig. 5

NETWORK GEO-LOCATION SYSTEM

This application claims the benefit of U.S. Provisional application No. 60/425,527 filed on Nov. 12, 2002.

BACKGROUND OF THE INVENTION

This invention relates to a network geo-location system, and more particularly to a method for identifying the geographic location of a computing device that is effecting a transaction with another computing device on a network such as the Internet.

For many network transactions it is unimportant where the parties are located, except for shipping and billing purposes. But there are situations where a party's location may be central to the entire transaction. For example, a seller offering bargain rates might desire to target potential customers in only a particular city or state, and in such a case it may be necessary to verify that a customer is indeed in the locality where he claims to be. Another example is that of a service that provides movies for viewing, with the content providers desiring to limit movie distribution to the United States only.

Every client on a network has an address, an IP address in the case of the Internet. There are services, such as those offered by the Quova Geopoint, the Digital Envoy Geo-Intelligence and the Digital Island TraceWare services, which provide the geographic location of a machine having a specific IP address. A service provider can thus check a customer's geographic location if it knows the customer's IP address. However, it is known that checking an IP address against a geographic database this way is imperfect for a number of reasons.

For several reasons, determining geographic locations from IP addresses may be incorrect and unreliable. Some of the reasons include: First, there is no assurance that when an IP address is assigned, the assignee will have provided accurate geographic data such as street, city, zip-code, and time-zone. Thus the geographic database consulted may not have the correct information. Second, a portable PC configured with a fixed (a non-Network Address Translation (NAT) or non-Dynamic Host Configuration Protocol (DHCP)) IP address, especially a laptop, can easily be taken to another locality and even out of the country. Third, routers can be configured to replace the client local address with a geographically acceptable address during transmission.

Another problem is that some Internet transactions involve the IP address of a proxy server rather than a client's IP address. For example, if an America Online ("AOL") subscriber has a network connection through a cable modem, DSL or an office network, this subscriber uses the IP address issued from the cable, DSL or office system to connect to the internet. But AOL's client application assigns to the subscriber a proxy address when using AOL. A service organization, such as Quova Geopoint, Digital Envoy Geo-Intelligence, or Digital Island TraceWare, that checks the geographic location of an AOL subscriber in the United States by looking at the IP address being used will likely determine that the subscriber has an address in Reston, Va., where AOL is located, rather than the true geographic address of the subscriber. This is because all of the AOL proxy IP addresses have a physical address of Reston, Va.

It is an object of our invention to provide a method for accurately determining the geographic location of a network user, a process that we call "Geo-Location."

It is another object of our invention to provide such a geo-location method that is less susceptible to tampering than methods that simply look up the location of a client PC IP address.

It is another object of our invention to prevent geographic IP spoofing by placement of a network device with a forged or stolen IP address between a client machine and the Internet.

SUMMARY OF THE INVENTION

As used herein, a network geo-location system is to be taken as a generic reference to a technique that determines the network addressable path between two computers on a network and collects the physical location information of the equipment along the network addressable path and processes that information in a manner that determines the location of one of the computers. The processing can be done by the computer whose location is to be determined, by the other computer, or even at a different site.

In accordance with our preferred method, an application server on a packet-switched network furnishes software to a client machine for performing trace-route or similar network analysis commands to known destination servers (e.g., eBay, Yahoo, Amazon, USPTO) or even servers at random locations. The trace-route command (such as "traceroute" in Unix, Linux and OS-x, and 'tracert' or 'pathping' in Windows operating systems) is used in a wide variety of computer operating systems and network appliances. A trace-route command causes packets to be sent out with short lifetimes in order to map the IP addressable route to another machine (eBay, etc.). Each packet is given a slightly different lifetime. When a router expires the packet, it sends back a notification that includes its IP address. This allows a machine to identify the addresses of all the routers between itself and some other machine on the Internet. Preferably, the machines called should require at least five hops from the client. (The first few hops from the client may be internal in that the routers in the path may have private addresses that are not routable on the public Internet, as set forth in "RFC 1918—Address Allocation for Private Internets." That is why at least five hops are preferred.)

The client software collects an array of IP addresses and other network information as a result of one or more trace-routes to one or more known server locations along addressable paths. The trace-route IP information thus ascertained is then transmitted from the client machine to the Internet server of the service provider that is trying to identify the geographic location of the client. Preferably, where the client initiates the transaction, for example, to "rent" a movie, the trace-route IP information is collected before contact with the movie-rental server is even made.

Using the array of IP addresses thus generated, the application server software of the Internet service provider then looks up data such as the node name (including the IP address), location (postal address), time zone, network name, and longitude and latitude of each Internet hop identified as a result of the trace-route command having been executed. This information is readily available in databases such as the one maintained by any of the Internet Corporation for Assigned Names and Numbers (ICANN) accredited registrars. Such a database contains location information for each IP address in North America and certain other territories. (Instead of using a comprehensive database such as the ICANN accredited registrars database to determine the geographic locations of the hops, private services, such as the Quova Geopoint, the Digital Envoy Geo-Intelligence and the Digital Island TraceWare services, can be used to determine the necessary data for each hop in the traced route.) In general, the analysis of a geographic location along an addressable path is a function of whether the geographic location is within or without the particular geographic region of interest.

Using at least some of the location information thus determined, the server can analyze location information of each Internet hop within each trace-route to a known server location and decide if the client PC is likely to be in or out of a particular geographic region. The geographic regions may be the United States, a state or city, a zip-code or any other defined geographic area. The data provided by the ICANN database, for example, includes a time zone for each IP address, and the time zone data can be used as an indication of geographic location.

A variety of methods can be used to analyze the trace-route data. The server can use the geographic information of all hops, or only a subset of the hops, to decide if the client is likely to be in or out of a geographic area. For example, the server can look at the first five hops from the client to the server. If four of the five routers have addresses within the geographic area of interest, the server can conclude that the client is probably within the geographic area. The number of hops to be evaluated for a given trace-route can be dynamically changed to tune the system. If too many clients are being determined incorrectly to be outside of the geographic area, then the server can be re-configured to adjust (reduce or increase) the number of hops to be evaluated or the criteria used. At a minimum, however, the addresses of at least two routable (public) hops must be analyzed.

Another way to analyze the trace-route data is to compare the data of pairs of trace-routes with each other. This can be done by applying a correlation coefficient algorithm to pairs of the trace-routes.

In the preferred embodiment of our invention, the route tracing is from the client to the server. It is possible to go in the other direction, from the server to the client, but this is not preferred.

Internet Service Providers such as AOL present a challenge without the inventive method described herein. A home PC of a residential broadband subscriber will be connected to AOL via a third party Internet Service Provider (ISP) DSL or cable modem whose network address will be assigned by the ISP as a routable static or dynamic IP address. AOL's software on a user's PC thus changes the user's IP address of the outgoing request packets to a proxy address that AOL uses. (This applies to dial-up accounts as well.) If the AOL-proxy address in the United States were used when practicing the method of our invention, it is likely to establish that the user is located in Reston, Va. (where AOL is domiciled). For this reason, the client software used in the practice of our invention generates its own request packets and bypasses the AOL proxy client. The packets' source IP address is that assigned to the PC by the ISP and the packets are not "proxy-ed" (i.e., replaced with an AOL IP address) as they leave the client PC. (As an added benefit, the server can prevent address spoofing (forging) at the client by recognizing that an AOL address should never be received from the client side of a traced route.)

BRIEF DESCRIPTIONS OF THE DRAWINGS

Further objects, features and advantages of the invention will become apparent upon consideration of the following detailed description in conjunction with the drawing, in which:

FIG. 5 depicts the kind of information that can be gathered from sources such as the ICANN accredited registrars database (although not all of it is actually used in the illustrative embodiment of the invention).

DETAILED DESCRIPTION

Figure 1:
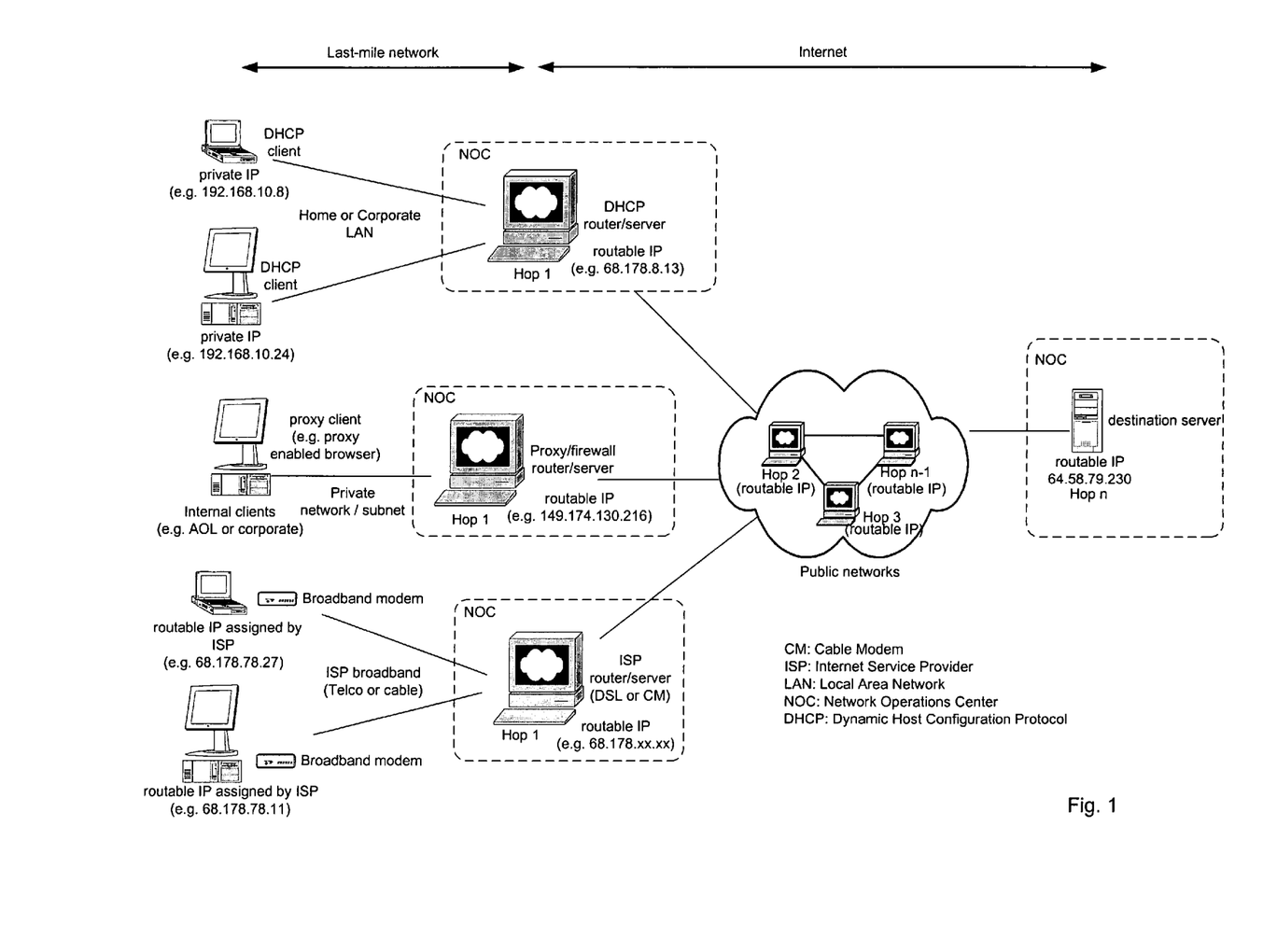
FIG. 1 is a high level view that depicts typical Internet connectivity of client networked devices (e.g., PCs, IP set-tops, handheld PDAs, etc.)

FIG. 1, which depicts typical Internet connectivity of client networked devices, shows how a data packet originating at a client device with a source IP address is routed by a "last-mile" broadband Internet service provider using a residential DSL line or cable modem, or a corporate LAN network, and many servers or routers on the Internet to a destination server whose address is specified in the packet header. Not all IP addresses are routable, which is to say that not all addresses are recognizable by routers on the Internet. The Dynamic Host Configuration Protocol (DHCP) is commonly used by a network service provider as a way to automate and manage the network configuration of desktop computers and other network devices that use the TCP/IP protocol. As shown by the uppermost of the three configurations on FIG. 1, the IP addresses of DHCP clients are generally private and dynamically assigned. A private address is typically used in a corporate enterprise network and will generally not be found in IP databases such as ICANN accredited registrars or Quova. A dynamically assigned IP address may randomly or periodically be changed by a network service provider.

The middle configuration in FIG. 1 depicts a proxy client. Even if an AOL subscriber, for example, has an IP address, when connected to AOL the subscriber uses a proxy address assigned dynamically by the service provider.

The bottom configuration shows two clients having routable IP addresses assigned by an Internet Service Provider (ISP) such as a DSL or cable modem ISP.

In our invention, a client requesting service from an application server generates request data packets that are used to "poll" any routers in the public network that receive them. These routers serve as "hops" along a network path to a destination server. Each router responds to a poll request with a response packet or notification that includes its own IP address. The trace-route command was specifically designed to discover addressable intermediate "hops" that form the path of a data packet from a client source to a destination server. The command generates a data packet or datagram in a format that is understood by every router or server that is deployed as part of the public networks that make up the Internet.

Figure 2:
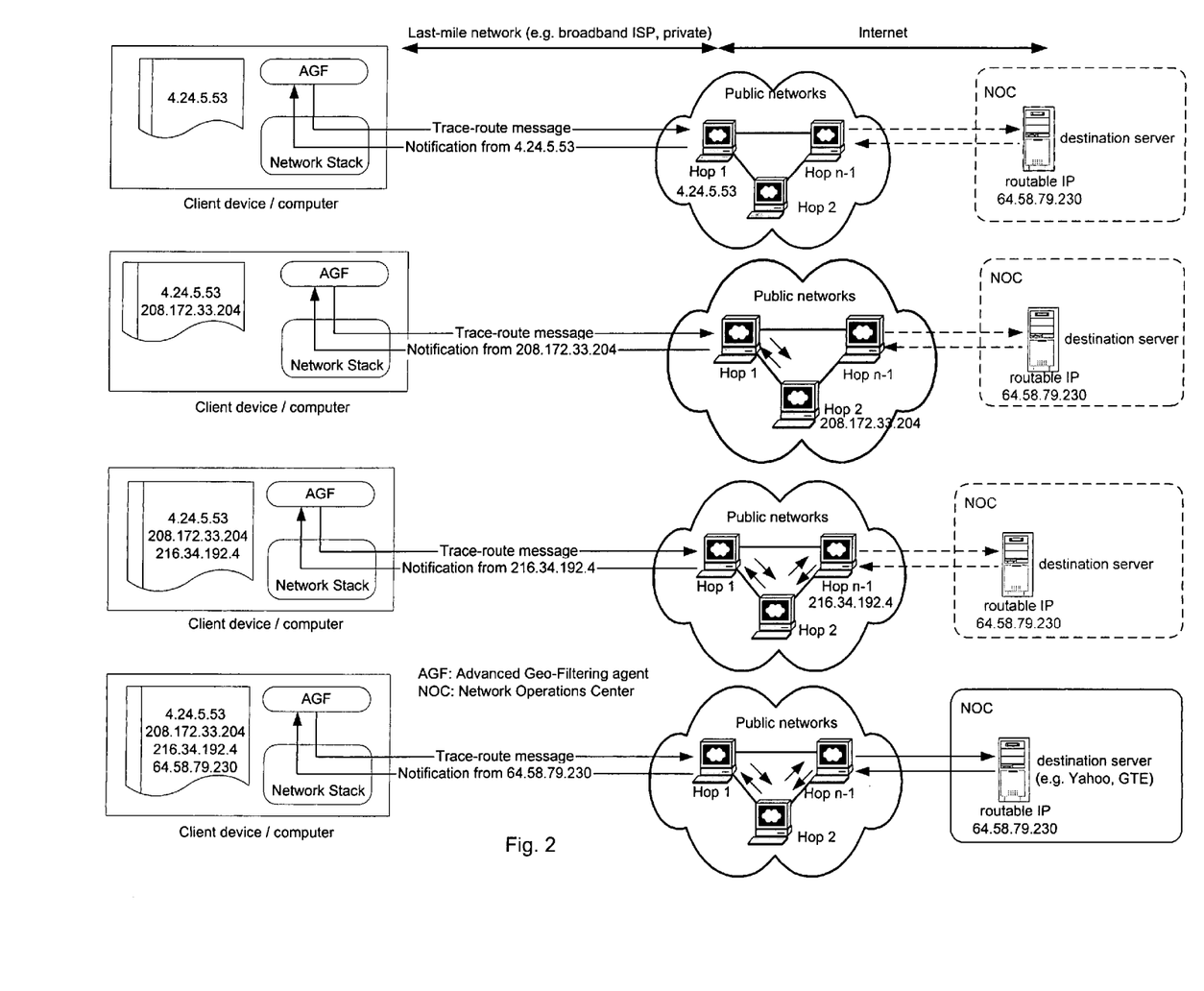
FIG. 2 depicts the first four steps in the execution of a typical trace-route command.

FIG. 1 shows how any of three Network Operation Centers, in a high level view each consisting of an IP addressable router and each constituting the first hop of the path a datagram takes towards its destination, extends packets to the second hop, and ultimately to the destination server (hop n). FIG. 2 shows the sequencing in greater detail, in four successive steps, and how as a result of the trace-route execution a list of hop addresses is compiled.

In FIG. 2, the symbol "Network Stack" refers to all processing and data having to do with TCP/IP transmission. The symbol AGF represents advanced geo-location agent software in the client machine (typically derived from the application server that wants to know the client's geographic location) and connotes that the processing involves more than just looking up the location of a single IP address. (As discussed above, if just the single IP address of a customer is checked, the geo-location process may be 'spoofed' or circumvented.) In the first step, the client device or computer sends a trace-route message to the first hop, shown as having an address 4.24.5.53. A notification from the router at this address back to the client device causes the address 4.24.5.53 to be put at the head of a list, shown at the upper left of the drawing. The trace-route command sends out many request packets, all with different lifetimes. The one that expires at hop 1 causes the return message. The other hops and the destination server are shown in pale outline because they are not yet involved in the sequencing.

The second step has a second request packet going through hop 1 and expiring at hop 2, a router with address 208.172.33.204. The expiration notification from this router goes back to the client device and the IP address of the second hop is added to the list being developed.

In a similar manner the address of the last hop (typically more than just three, as shown) is sent back to the client and added to the list. Finally, in the fourth step the address of the destination server is added to the list. The destination server serves no function other than to serve as an end point for a path traced out from the client whose geographic location is of interest.

Figure 3:
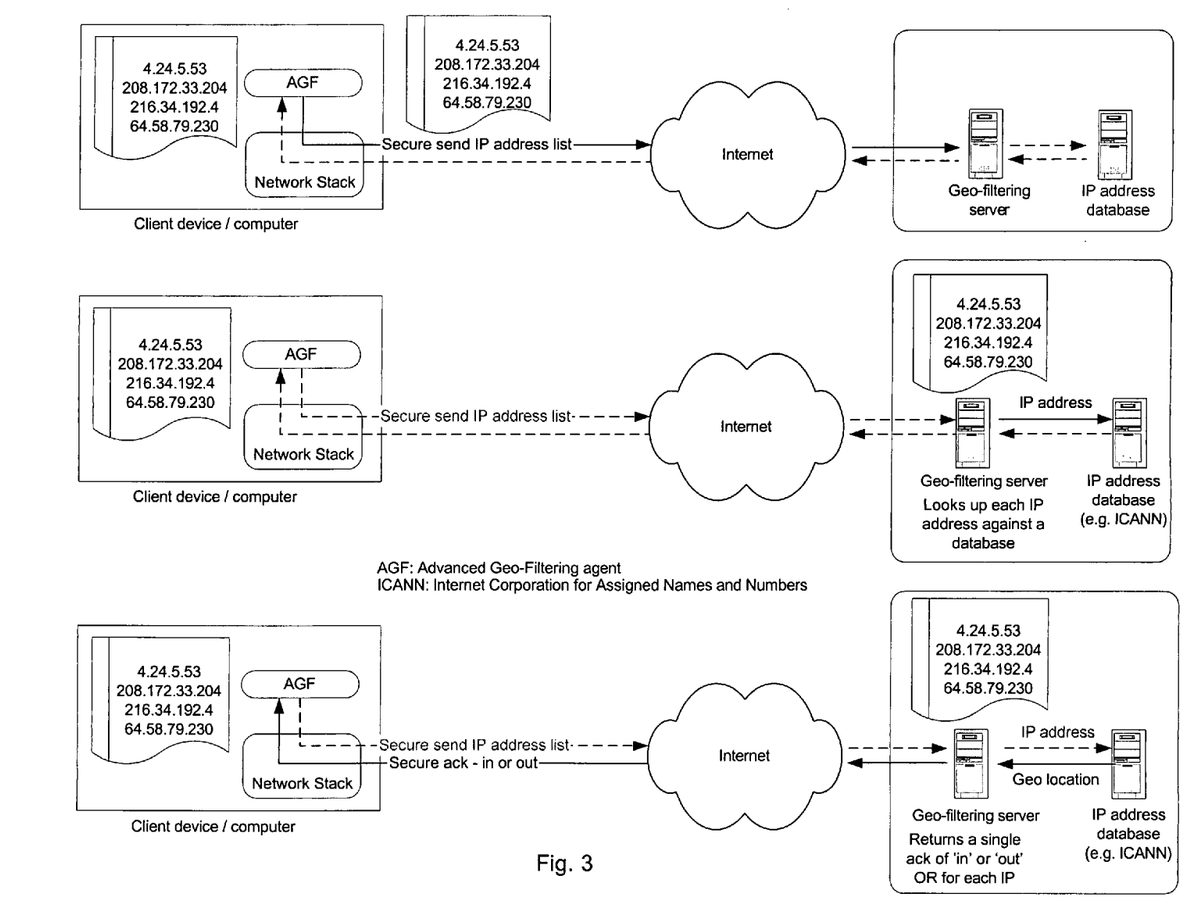
FIG. 3 depicts the steps of our invention, in the illustrative embodiment thereof, following execution of trace-route commands.

FIG. 3 shows the message flow that takes place after the list of hop IP addresses is compiled. The three steps provide the raw data from which the geographic location of the client (in or out of a specified territory) can be determined. In the first step, the list of IP address hops is securely sent to the geo-location agent (AGF) at the site of the application server that wants to know the location of the client. (Obviously, it is not necessary that the processing be done at this site. The processing can be done at some other site, for example, at a site that authorizes a credit card transaction, not shown. The processing can even be done in its entirety by the client, with the client accessing an ICANN accredited registrar or other database directly after compiling the IP address list.) In the second step the geo-location server looks up each IP address in the list against a database such as one provided by an ICANN accredited registrar. The only information desired in the illustrative embodiment of the invention is whether each hop address is in a specified territory or outside of it. The acknowledgement (ack) for each hop is sent to the client where the decision is finally made, as shown in the last step of FIG. 3. As indicated, the server can perform the processing based on the individual 'in' and 'out' determinations, and send to the client the final result for the client IP address.

The table of FIG. 5 shows the kinds of information that can be gathered from available databases such as ICANN accredited registrars—IP address, node name, location, time zone and network. (Location information is not generally available for hops within a private network.) The Ms (millisecond) column is not derived from a database, but rather represents the expiration time for each packet sent out in response to the trace-route command. Not all of the information is required. In its simplest form the acknowledgement sent to the client simply identifies whether each hop is in the territory of interest (e.g., the continental United States) or outside it. The simplest test for whether the client is in the territory might be whether n out of m hops are in the desired territory. A range of IP addresses can be analyzed. Through a tuning process, the system can be optimized to analyze just a range of hops, such as hops 3 through 5.

It is possible when using an n-out-of-m test to assign weights to the hops that are closest to the client. Weighting the hops this way gives recognition to the fact that the first public hops (beyond private hops, if any) from the client are likely to be the nearest routers geographically. (It would be a rare scenario where the client is geographically located in the U.S. and near the US-Canada or US-Mexico borders. The first public hop in such a case could be located at the nearest NOC that happens to be on the non-US side of the border.)

An alternative method for determining the geographic location of a client device could be to define a minimum number of sequential hops that must be individually "in" the acceptable geographic area. This requirement could be expanded to require that a client must meet the minimum number of "in" hops n number of times (i.e., n runs of the trace-route test) in order to pass the geo-location test. For example, the "in" test could be that the trace-route of a client device must show the first five hops from the device's location as "in" in three different trace-route tests sequentially (or simultaneously) targeting three different well known destination servers (or one server). The combination of the variables of the number of first n "in" hops and number of runs of trace-route tests constitute a pass/fail threshold, which can be adjusted or optimized for certain business rules.

Figure 4:
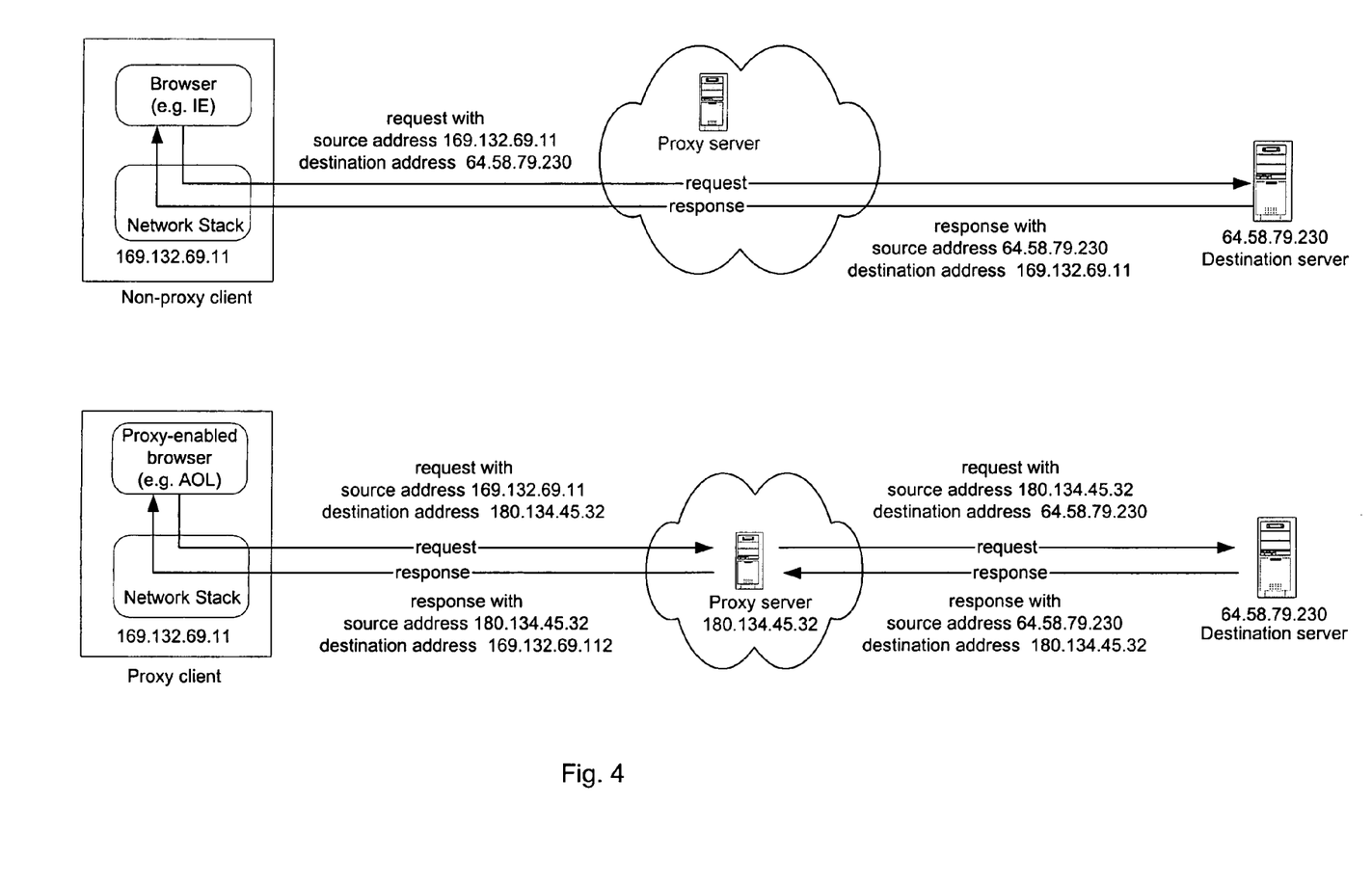
FIG. 4 shows why it is preferable that the client software generate its own trace-route request and bypass a proxy client such as AOL.

FIG. 4 shows the problem encountered when a client machine connects to the internet through an ISP such AOL that assigns a proxy address to the client. The upper sketch shows that when using a browser such as Microsoft's Internet Explorer on a client machine that uses its own IP address, all requests originate with, and all responses terminate at, the client machine. But the lower sketch shows a client machine equipped with a proxy-enabled browser such as that furnished by AOL. Even if the machine has its own IP address, when it is connected to AOL in the United States, source requests from AOL identify the AOL proxy address (180.134.45.32) and packet expiration notices are delivered to the same address at AOL. The IP address list that is developed and sent back to the client is a list of hops between AOL (in Reston, Va.) and the destination server. The hops that are most important in determining a geographic location are those closest to the client, and these are not included in the list. It is for this reason that the client should generate the trace-route commands using its own IP address, bypassing the proxy server of the ISP to which it is connected. (If the application server receives an IP address list that includes an AOL address, which should never be the case if things are proper, it is an indication that the client tried to spoof the system and service can be denied.)

While the simplest test is of the form n-out-of-m, as discussed above, or whether the first n (typically, 5) hops from the client are in the territory of interest, we have also developed a more sophisticated test in which a correlation coefficient algorithm is applied to pairs of trace-routes. If two trace-routes are highly correlated, then it is likely that there has been no tampering with the client machine in order to "fool" the system. As an example, consider the following two trace-routes:

| Hop | Geographic Area | Trace-Route One Weighted Importance | Geographic Area | Trace-Route Two Weighted Importance |
|---|---|---|---|---|
| 1 | In | 10 | In | 10 |
| 2 | In | 9 | In | 9 |
| 3 | In | 8 | In | 8 |
| 4 | In | 7 | In | 7 |
| 5 | In | 6 | Out | 0 |
| 6 | In | 5 | Out | 0 |
| 7 | Out | 0 | Out | 0 |
| 8 | Out | 0 | Out | 0 |
| 9 | Out | 0 | Out | 0 |
| 10 | Out | 0 | Out | 0 |

The first trace-route has the first six hops in the geographic region of interest. The first hop is the most important so it is given a weight of 10. The next five hops also count, but their weights are successively smaller. The second trace-route has only four hops that are "in" the geographic region of interest. The algorithm now to be described gives greater weight to hops that are closer to the client machine, and it focuses on whether every address along the public trace-route is within the geographic region of interest or outside of it. (If the two trace-routes have different numbers of hops, the smaller number is used for both trace-routes, the hops in the longer trace-route that are closest to the client machine being those selected for use.)

The degree of association between two trace-routes can be measured by a correlation coefficient, or what is sometimes referred to as the measure of linear association. The correlation coefficient, r, is expressed on a scale from +1 to −1. Complete correlation between two variables is expressed by either +1 or −1. When one variable increases as the other increases, the correlation is positive; when one decreases as the other increases it is negative. Complete absence of correlation is represented by 0. A value of r that exceeds a threshold value is indicative of the client machine being "in" the geographic region of interest.

The calculation of the correlation coefficient is as follows, with x representing the values of one trace route and y representing the values of the other trace route. Each x or y value is 0 if the respective hop is "Out" of the geographic region of interest. If it is "in", then the value is its weighted importance. The formula used is $$r = \frac{\sum xy - n\bar{x}\bar{y}}{(n-1)SD(x)SD(y)}$$

where $SD(x)$ and $SD(y)$ are standard deviations of the two variables.

Assuming n is the number of data points in a data set and x is a data point, the Standard Deviation $SD(x)$ is computed as follows:

1. Take the average (mean) of all data points, $avg(x)$.
2. For each data point x, calculate $z=x-avg(x)$.
3. Take the square of each z.
4. Calculate the sum of all the squared values, S.
5. Divide S by (n−1).
6. The square root of the result in step 5 is the standard deviation.

The formula is applied to the second trace-route data in the table above as follows:

1. $avg(x)=(10+9+8+7+0+0+0+0+0+0)/10=3.4$
2. The ten values of z (each is the value of a data point minus 3.4) are 6.6, 5.6, 4.6, 3.6, −3.4, −3.4, −3.4, −3.4, −3.4, −3.4.
3. The squares of the values of z are 43.56, 31.36, 21.16, 12.96, 11.56 (the product of −3.4 and −3.4 is 11.56), 11.56, 11.56, 11.56, 11.56, 11.56.
4. The sum of the squared values, S, is 43.56+31.36+21.16+12.96+11.56+11.56+11.56+11.56+11.56+11.56= 178.40.
5. Dividing S by (n−1) yields 178.40/9=19.8222.
6. The square root of 19.8222, the standard deviation, is 4.4522.

In a similar way the mean and standard deviation for the data of the first trace-route can be calculated to be 4.5 and 4.1163 respectively.

The denominator in the formula for r is $(n-1)SD(x)SD(y)$. Substituting values yields (10−1)(4.1163)(4.4522) or 164.942. For the numerator, first each value of x is multiplied by the corresponding value of y, and the products are summed, yielding 294. From this is subtracted (10)(4.5)(3.4) or 153. The numerator is thus 294−153, or 141. When the numerator is divided by the denominator, the result is r=0.854. The threshold for strong correlation can be anywhere between 0.2 and 0.5, so a result of 0.854 exceeds all possible thresholds. The correlation coefficient of 0.854 indicates a strong positive correlation between the two trace-routes, i.e., they are closely associated with each other. Together, they indicate that the client machine location is very likely to be within the "In" geographic region.

As mentioned above, a simple n-out-of-m test on a single trace-route, or even just checking that the first few public hops are in the region of interest, can suffice. But the more sophisticated correlation test just described ensures against tampering because it is difficult to "fake" multiple routes from a client machine. But the correlation test takes longer to implement. It may be necessary to strike a balance between network response time (delay in performing the test) and confidence in the rejection of client machines out of the region of interest. The more trace-routes that are processed the longer the delay, but the greater the confidence in the results.

If three trace-routes are taken, it is possible to process three different pairs. Requiring all pairs to have correlations that exceed a threshold increases the likelihood that a client machine out of the region will be rejected, but it also increases the risk that a machine in the region will also be rejected. (Alternatively, the test criterion might be that the average correlation value must exceed the threshold.) Similarly, the threshold that is chosen for r (typically between 0.2 and 0.5) can be adjusted to shift the balance between false "positives" and false "negatives." A correlation test such as that described allows the geo-location process to be adjusted by the service provided—for example, based on customer complaints and other business information—if too many client machines out of the region are passing the test, or too many client machines in the region are not passing the test.

It should be understood that the data set that is used in the correlation test (with data points ranging from 10 to 1 for "In", and 0 for "Out") is not really a statistical reflection of a distribution curve in a sense of how close to (or spread out) the data points are relative to the mean. In other words, a low standard deviation as used in our application does not mean that more data points are closer to the mean. Since we have only a binary value ("In" or "Out" for each data point regardless of its value), the standard deviation of a data set of hop values alone would probably mean little other than perhaps an indication of a larger (or smaller) number of non-zero data points in the data set resulting in a lower (or higher) value of standard deviation.

No matter what test criteria are used, the first public hop should be "In." If it isn't, it is a good indication that the client machine is "Out" of the region of interest. This follows the same philosophy that hops closest to the client machine are the most important, as reflected in the decreasing values of the weights used in constructing the data table.

As mentioned above, geo-location can be implemented by performing trace-routes from the client to the server or by performing trace-routes from the server to the client. The system is more effective when trace-routes are conducted from the client whose non-routable IP address will appear in the trace-route results. Non-routable IP addresses, also known as private IP addresses, are those that execution of a trace-route command can not identify. They are commonly identified by the RFC 1918 octet patterns 192.168/16, 10.x and 172.16/12 (classless inter-domain routing notation). These address patterns and other non-routable addresses can only be identified when the client executes the trace-route command. This is particularly true with home or corporate routers that are DHCP enabled and use non-routable IP addresses by default. Similarly, when a server executes a trace-route command to the client, many home or corporate routers (with DHCP enabled) providing a non-routable address stop the servers request packet from reaching the client and therefore may render geo-location ineffective in its analysis. When performing the same function on the client computer, however, the complete path of hops between the client and the server are known and therefore the system is more difficult to spoof.

Although the invention has been described with reference to a particular embodiment, it is to be understood that this embodiment is merely illustrative of the application of the principles of the invention. Numerous modifications may be made in the illustrative embodiment of the invention and other arrangements may be devised without departing from the spirit and scope of the invention.

What we claim is:

1. A method by which an application server on a packet-switched network can determine whether a client machine on the network is likely to be located in a particular geographic region comprising the steps of:
    (a) tracing at least one addressable path having at least five hogs through the network from the client machine to a destination server, said destination server being at a geographic region different from that of said application server,
    (b) collecting an array of network information that includes at least two network addresses along said at least one addressable path,
    (c) providing said array of network information to said application server that is to determine whether said client machine is likely to be located in said particular geographic region,
    (d) controlling said application server to look up data for each network address along said at least one addressable path to determine the geographic locations of the network addresses along said path, and
    (e) analyzing the geographic locations of the network addresses along said at least one addressable path to determine whether said client machine is likely to be located in said particular geographic region.

2. A method by which an application server on a packet-switched network can determine whether a client machine on the network is likely to be located in a particular geographic region in accordance with claim 1 wherein an array of network information is collected for at least two addressable paths, and the geographic locations of the network addresses along said at least two addressable paths are correlated with each other to determine whether said client machine is likely to be located in said particular geographic region.

3. A method by which an application server on a packet-switched network can determine whether a client machine on the network is likely to be located in a particular geographic region in accordance with claim 1 wherein analysis of a geographic location along an addressable path is a function of whether said geographic location is within or without said particular geographic region.

4. A method by which an application server on a packet-switched network can determine whether a client machine on the network is likely to be located in a particular geographic region in accordance with claim 1 wherein the effect of the geographic location of each address along an addressable path on the determination of whether said client machine is likely to be located in said particular geographic region is a function of how close said geographic location is to said client machine.

5. A method by which an application server on a packet-switched network can determine whether a client machine on the network is likely to be located in a particular geographic region in accordance with claim 4 wherein how close a geographic location is to said client machine is measured by the number of hops along an addressable path between said client machine and said geographic location.

6. A method by which an application server on a packet-switched network can determine whether a client machine on the network is likely to be located in a particular geographic region in accordance with claim 1 wherein said particular geographic location is the United States.

7. A method by which an application server on a packet-switched network can determine whether a client machine on the network is likely to be located in a particular geographic region in accordance with claim 1 wherein initial hops from said client machine that have private addresses that are not routable on the network are not included in the collected array of network information.

8. A method by which an application server on a packet-switched network can determine whether a client machine on the network is likely to be located in a particular geographic region in accordance with claim 1 wherein the client machine generates its own data packets in tracing an addressable path through the network rather than using any proxy address that would otherwise normally be used.

9. A method by which an application server on a packet-switched network can determine whether a client machine on the network is likely to be located in a particular geographic region in accordance with claim 1 wherein the effect of the geographic location of each address along an addressable path on the determination of whether said client machine is likely to be located in said particular geographic region is a function of the number of hops along said addressable path between said client machine and said geographic location.

* * * * *